L. F. KNODERER.
GAS BURNER.
APPLICATION FILED JAN. 17, 1910.

981,573.

Patented Jan. 10, 1911.

Witnesses
E. B. Maurer.
A. L. Phelps

Inventor
Levi F. Knoderer
By C. C. Shepherd
Attorney

UNITED STATES PATENT OFFICE.

LEVI F. KNODERER, OF COLUMBUS, OHIO.

GAS-BURNER.

981,573.  Specification of Letters Patent.  Patented Jan. 10, 1911.

Application filed January 17, 1910. Serial No. 538,350.

*To all whom it may concern:*

Be it known that I, LEVI F. KNODERER, a citizen of the United States, residing at Columbus, in the county of Franklin and State of Ohio, have invented certain new and useful Improvements in Gas-Burners, of which the following is a specification.

My invention relates to the improvement of gas burners of that class which are particularly adapted for heating purposes and which may be utilized in connection with the fire-pots of stoves, warm air furnaces, hot water, steam and other heating appliances.

The objects of my invention are to provide a burner of this class of simple and effective construction whereby a high degree of heat may be generated with the consumption of a comparatively small quantity of gas; to so construct my improved burner as to insure a proper mixture of gas and air; to provide improved means for deflecting the heat outwardly and upwardly from the burner body to the point of most effective heat radiation and to provide other improvements the details of which will be more fully pointed out hereinafter. These objects I accomplish in the manner illustrated in the accompanying drawing, in which—

Figure 1:
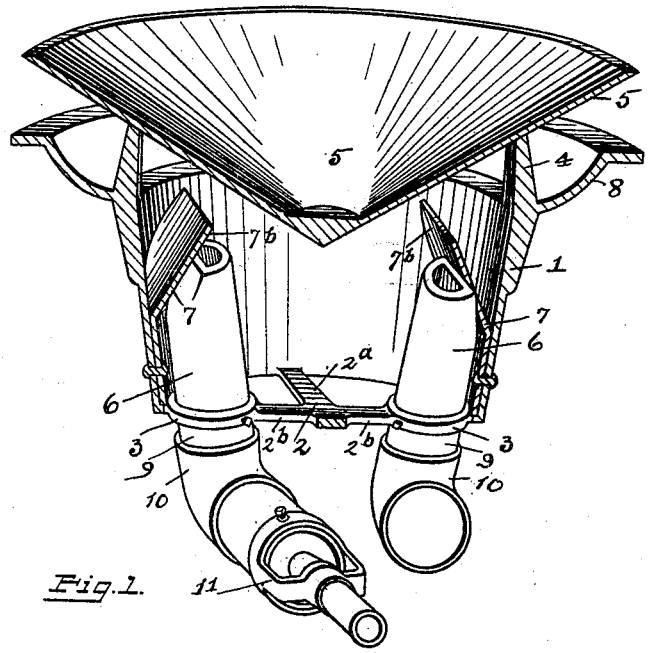
Figure 2:
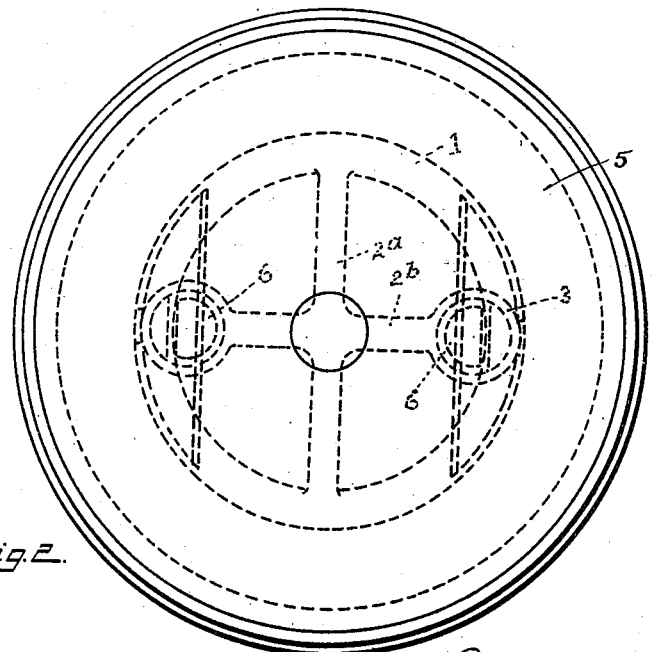

Figure 1 is a sectional perspective view of a gas burner constructed in accordance with the invention, and Fig. 2 is a plan view thereof.

Similar numerals refer to similar parts throughout the several views.

In the burner here illustrated I employ a cylindrical body or outer casing 1 which may, however, be of other suitable outline and which serves as a secondary mixing chamber to which the other parts of my burner are adjusted as hereinafter set forth. The lower end of the casing 1 is intersected by an open-work frame or spider 2 comprising in the present instance cross arms $2^a$ and $2^b$. The cross arm $2^b$ has formed therewith on each side of the center of its length a ring or retaining member 3.

Supported by upright arms 4 which project from the upper side of the casing or by other suitable means, is an upwardly and outwardly inclined or substantially conical baffle plate 5, the upper and outer marginal portion of which extends above and beyond the casing 1 and the tapering center of which depends within the upper portion of the casing.

In each of the ring or socket members 3 is detachably secured the lower portion of an upwardly extending cylindrical burner member 6, each of these burners having its burner or nozzle end portion flattened on its outer side or the side nearest the walls of the casing or mixing chamber 1.

To the inner wall surface of the secondary mixing chamber casing 1 and on the outer side of each burner member 6 is secured or formed as a part of the casing 1, the vertical lower portion of a baffle plate 7, the upper inturned and inclined member $7^b$ of which extends over the upper nozzle end of the adjacent burner 6. It will be observed that the baffle plate members $7^b$ are formed with opposing inclinations from the inclination of the baffle plate 5.

With the upper portion of the secondary mixing chamber casing 1, I have shown an external outwardly projecting flange 8 which may be utilized as a bracket for the suspension of the burner body in connection with a fire pot or other support, although it is obvious that said supporting flange or bracket may be omitted where the same is not particularly desired for use as a supporting or suspending device.

With the lower end of each of the burner members 6 is suitably connected a pipe section 9 and with each of the latter is connected a supply pipe section 10 which is provided with a suitable form of adjustable mixer 11.

In utilizing my invention, the gas enters the supply pipes 10 through the mixers 11 in the usual manner and the mingled gas and air is thence conducted through the pipe sections 9 and burner members 6 at the outlet nozzles of which it is ignited. In the manner described, it will be understood that the supply pipes 10 and sections 3 become primary mixing chambers, with the result that a combustible mixture of gas and air is under pressure of the gas, discharged with great speed through the burner nozzles. The flame is therefore driven with considerable force against the baffle plate members $7^b$ which in turn spread and deflect the flame toward the lower point of the conical baffle plate or deflector 5 against the under surface of which the flame is further broken and mixed with the additional air, that as a result of the strong upward draft created, rushes into the open lower end of the secondary mixing chamber, thereby causing a powerful hot air blast to pass rapidly outward and upward beyond the edges of the baffling deflector 5 toward the walls of the furnace or other heating appliance. From this operation, it will be seen that for each separate fuel supply connection is provided two mixing chambers, the primary one being composed of the pipe members 9, 10 and burner tubes 6, the secondary mixing chamber being formed within the outer casing 1. In order to accomplish a further and more perfect mixture of the gas and air, I have provided the primary baffling plates 7—7$^b$ inclined as described above the burner nozzles and the secondary inclined baffle plate or deflector 5. The results of this construction are first, that the gas and air in substantially the right proportions are so thoroughly baffled and mixed that all of the gas turned on by the valves, will be utilized in generating a heat of the greatest possible intensity and second, that the perfect mixture of the gas and air in the right proportions for proper combustion, is accomplished automatically regardless of the quantity of gas turned into the burner, because the greater the gas pressure, the greater the draft created, and therefore a greater amount of air is drawn into the secondary mixing chamber, thus making the mixing automatic, regardless of the amount of gas. It is obvious that both the burners may be utilized simultaneously or that the same may be used independently.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claim.

What I claim, is—

In a gas burner, the combination with a cylindrical outer casing having a flaring top and lateral flange, said casing being open at both ends, of a webbed member extending across the bottom of said casing and rigidly fastened thereto, a plurality of burner jets passing up through said web and fastened thereto, baffle plates inwardly and upwardly inclined one above each jet and fastened to the inner wall of said casing, a conical plate above said casing with its apex extending down, and means for suspending said plate.

In testimony whereof I affix my signature in presence of two witnesses.

LEVI F. KNODERER.

Witnesses:
C. C. SHEPHERD,
E. V. GRISWOLD.